(12) United States Patent
Mine et al.

(10) Patent No.: US 6,718,113 B2
(45) Date of Patent: Apr. 6, 2004

(54) CONVERSION PLUG FOR AN OPTICAL SIGNAL AND METHOD OF FABRICATING THE CONVERSION PLUG

(75) Inventors: Keiji Mine, Osaka (JP); Hiroshi Nakagawa, Kyoto (JP)

(73) Assignee: Hosiden Corporation, Osaka (JP)

( * ) Notice: Subject to any disclaimer, the term of this patent is extended or adjusted under 35 U.S.C. 154(b) by 8 days.

(21) Appl. No.: 10/156,351

(22) Filed: May 28, 2002

(65) Prior Publication Data

US 2002/0177364 A1 Nov. 28, 2002

(30) Foreign Application Priority Data

May 25, 2001 (JP) ........................................ 2001-156711

(51) Int. Cl.$^7$ ................................................ G02B 6/36
(52) U.S. Cl. ........................................ 385/139; 385/88
(58) Field of Search ............................. 385/78, 88, 139; 439/669

(56) References Cited

U.S. PATENT DOCUMENTS

| | | | | |
|---|---|---|---|---|
| 4,857,014 A | * | 8/1989 | Alf et al. ................... | 439/578 |
| 5,796,898 A | * | 8/1998 | Lee ............................ | 385/78 |
| 6,347,889 B1 | * | 2/2002 | Cheng ........................ | 385/60 |
| 6,386,766 B1 | * | 5/2002 | Lee ............................ | 385/56 |
| 6,595,697 B2 | * | 7/2003 | Hirabayashi et al. ......... | 385/78 |
| 2002/0146214 A1 | * | 10/2002 | Tanaka et al. ................ | 385/78 |

* cited by examiner

Primary Examiner—Michael C. Zarroli
(74) Attorney, Agent, or Firm—David N. Lathrop, Esq.; Gallagher & Lathrop

(57) ABSTRACT

A conversion plug for an optical signal includes a plug portion and a plug-in hole. The plug portion, which is to be inserted directly into an optical signal terminal of a specified size, is constituted by a tip portion and a sleeve portion of a ferrule. The plug-in hole, into which an optical plug having a plug portion that cannot be inserted directly into the optical signal terminal of a specified size can be inserted, is formed in a fistulous optical plug supporting member to be tightly fitted into the ferrule. An optical fiber has an optical fiber fixing ring previously joined therewith on the periphery of one end portion of the optical fiber, and the end surface of the optical fiber protruding from the optical fiber fixing ring is previously finished in mirror surface. The optical fiber fixing ring and the optical fiber are inserted into the ferrule, and the optical fiber fixing ring is tightly fitted into the inside of the ferrule to fix the position of the end surface of the optical fiber already finished in mirror surface and inserted into a sleeve portion and a tip portion of the ferrule, at the optimal position.

14 Claims, 6 Drawing Sheets

CONVERSION PLUG FOR AN OPTICAL SIGNAL AND METHOD OF FABRICATING THE CONVERSION PLUG

BACKGROUND OF THE INVENTION

1. Field of the Invention

The present invention relates to a conversion plug for an optical or light signal configured such that it can be plugged in directly an optical signal input terminal or optical signal output terminal mounted on one of various types of audio visual apparatuses or devices, personal computers, etc., and a method of fabricating the conversion plug, and more particularly, to a conversion plug for an optical or light signal comprising a plug portion adapted to be plugged in directly the optical signal input or output terminal and a plug-in hole for an optical plug that cannot be plugged in directly the optical signal input or output terminal, and capable of optically coupling between the optical plug inserted into the plug-in hole and the optical signal input or output terminal with low optical loss, and a method of fabricating such conversion plug.

2. Description of the Related Art

In recent years, with the advance of optoelectronics, there have been provided many kinds of audio visual apparatuses such as a DVD (Digital Versatile Disk) player/recorder, MD (Mini-Disk) player/recorder, CD (Compact Disk) player/recorder and the like, and electronic apparatuses or devices such as personal computers and the like, each being provided with an optical input terminal and/or optical output terminal for an optical or light digital signal (hereinafter, referred to as optical signal terminal). In an optical signal terminal is directly plugged one of two optical plugs mounted to an optical cable (for example, optical fiber) at opposed ends thereof respectively, that transmits an optical or light digital signal, thereby to transmit an optical digital signal from the optical signal terminal to the optical cable or from the optical cable to the optical signal terminal.

In Japan, there have been generally used as optical connectors for a digital audio signal an optical plug having its plug portion of 3.5 mm in outside diameter and an optical signal terminal (optical receptacle or jack) configured such that an optical plug of this size can be plugged in, and an optical plug having its plug portion of 2.5 mm in outside diameter and an optical signal terminal (optical receptacle or jack) configured such that an optical plug of this size can be plugged in. In addition, there are two types of optical plugs one being called a round or circular shape optical plug and the other being called a square or quadrilateral shape optical plug from the external appearances of their plug portions. The round shape optical plug can be plugged in only an optical signal terminal having its structure corresponding to that optical plug, and likewise, the square shape optical plug can be plugged in only an optical signal terminal having its structure corresponding to that optical plug. Though a square shape optical plug is configured that its core, namely, optical fiber projecting therefrom has a rod-like shape that is circular in section, a wall member of polygonal or square shape in section is coaxially formed about the core, and hence it will be called a square or quadrilateral shape plug.

As a result, it is impossible to plug a round shape optical plug having its plug portion of 3.5 mm in outside diameter in an optical signal terminal configured such that a round shape optical plug having its plug portion of 2.5 mm in outside diameter, for example, can be plugged in, and it is also impossible to plug a round shape optical plug having its plug portion of 2.5 mm in outside diameter in an optical signal terminal configured such that a round shape optical plug having its plug portion of 3.5 mm in outside diameter can be plugged in. The same is true in case of square shape optical plugs. In addition, even if two optical plugs have their plug portions of the same outside diameter, it is impossible to plug a round shape optical plug in an optical signal terminal configured such that a square shape optical plug can be plugged in, and it is also impossible to plug a square shape optical plug in an optical signal terminal configured such that a round shape optical plug can be plugged in.

For the reason described above, as is disclosed in Japanese Patent Application Public Disclosure No. hei 5-88043 (88043/1993), for example, there has been proposed an optical adapter that is capable of connecting two optical plugs having their plug portions of different outside diameters with each other. This optical adapter comprises a cylindrical adapter housing and an optical fiber of a predetermined length aligned on the central axis of the adapter housing, and optically couples, through the optical fiber aligned on the central axis of the adapter housing, between two optical plugs having their plug portions of different outside diameters plugged in the adapter housing from the opposed end portions thereof, respectively. If such type of optical adapter is used, it is possible to optically connect, for example, between a round shape optical plug having its plug portion of 3.5 mm in outside diameter and a round shape optical plug having its plug portion of 2.5 mm in outside diameter, between a round shape optical plug having its plug portion of 3.5 mm in outside diameter and a square shape optical plug having its plug portion of 2.5 mm in outside diameter, between a square shape optical plug having its plug portion of 3.5 mm in outside diameter and a round shape optical plug having its plug portion of 2.5 mm in outside diameter, or between a square shape optical plug having its plug portion of 3.5 mm in outside diameter and a square shape optical plug having its plug portion of 2.5 mm in outside diameter, with each other.

As described above, an optical plug is mounted to each end of an optical cable (an optical fiber is typically used as an optical cable, and hence it will be referred to as optical fiber, hereinafter), and one plug of the optical fiber is plugged in an optical signal terminal mounted on one of electronic apparatuses or devices or the like and the other plug thereof is plugged in the optical adapter. Since two optical plugs are inserted into the optical adapter, an optical coupling is effected between the optical fiber of the one optical plug inserted thereinto and the optical fiber provided in the optical adapter and between the optical fiber of the other optical plug inserted thereinto and the optical fiber provided in the optical adapter. In this manner, optical couplings inevitably occur twice in the optical adapter of such type, and hence there is an serious disadvantage that optical loss is increased. Moreover, two optical fibers are optically connected in series with each other through the optical adapter, and if the two optical fibers have the same length, the total length of the two optical fibers becomes twice the length of one optical fiber. It is preferred that the length of an optical fiber is as short as possible for the reason of optical transmission characteristic thereof.

For the aforesaid reasons, there has been earnestly desired in this technical field a conversion plug for an optical signal adapted to optically couple an optical plug that cannot be plugged in directly a desired optical signal terminal to this desired optical signal terminal with low optical loss and without lengthening the total length of the optical fiber.

In the technical field of electrical connectors, there has been put to practical use as disclosed in, for example, Japanese Utility Model Application Publication No. hei 1-29751 (29751/1989) an adapter-plug adapted to be capable of electrically connecting an electric plug that cannot be plugged in directly a receptacle or jack mounted on one of audio visual apparatuses or devices, and electronic apparatuses or devices such as personal computers and the like because the plug portion thereof has a different outside diameter, to that receptacle or jack. Such adapter-plug for an electrical signal is constructed such that it electrically connects an electric plug inserted into the adapter-plug with the adapter-plug with each other by use of electric contact pieces. Therefore, there is no technical concept at all in the adapter-plug for an electrical signal that it optically couple an electric plug inserted into the adapter-plug with the adapter-plug.

SUMMARY OF THE INVENTION

An object of the present invention is to provide a conversion plug for an optical signal adapted to be capable of optically coupling an optical plug that cannot be plugged in directly a desired optical signal terminal to this desired optical signal terminal with low optical loss.

Another object of the present invention is to provide a conversion plug for an optical signal that is low in optical loss, is easy in fabrication, and is inexpensive.

Further object of the present invention is to provide a method of fabricating easily a conversion plug for an optical signal that is low in optical loss.

In order to accomplish the foregoing objects, in one aspect of the present invention, there is provided a conversion plug for an optical signal which comprises: a plug portion to be inserted into directly an optical signal terminal of a specified size and having an optical fiber inserted thereinto; and a plug-in hole into which an optical plug having a plug portion that cannot be inserted into directly the optical signal terminal of a specified size can be inserted.

In a preferred embodiment, the aforesaid optical fiber to be inserted into the plug portion of the conversion plug has an optical fiber fixing ring previously joined with the optical fiber on the periphery of one end portion of the optical fiber, the end surface of the optical fiber protruding from the optical fiber fixing ring having been finished in mirror surface. The optical fiber fixing ring and the optical fiber are inserted into the conversion plug, and the optical fiber fixing ring is tightly fitted into the inside of the conversion plug to fix the position of the end surface of the optical fiber already finished in mirror surface.

The aforesaid conversion plug comprises: a ferrule constituted by a cylindrical sleeve portion having a fistulous tip portion at the forward end thereof, and a fistulous base portion formed integrally with the sleeve portion and having its outside dimension larger than that of the sleeve portion; and a fistulous optical plug supporting member to be tightly fitted into the inside of the fistulous base portion of the ferrule. The plug portion of the conversion plug is constituted by the tip portion and the sleeve portion of the ferrule, and the optical fiber is inserted into a through hole formed in the sleeve portion and the tip portion from the inside of the fistulous base portion of the ferrule as the optical fiber fixing ring is tightly fitted into the inside of the fistulous base portion of the ferrule. The plug-in hole of the conversion plug is formed in the fistulous optical plug supporting member.

In addition, the aforesaid conversion plug further includes an engagement spring to be inserted into inside of the fistulous base portion of the ferrule in such manner that it is in contact with the forward end of the fistulous optical plug supporting member, and elastically engaging and holding a tip portion of the plug portion of an optical plug to be inserted into the plug-in hole of the fistulous optical plug supporting member. The conversion plug further includes: a member made of an insulator that covers an peripheral area extending from the vicinity of the forward end portion of the sleeve portion of the ferrule to the vicinity of the forward end of the fistulous base portion of the ferrule; and a handle portion made of an insulator that covers the periphery of the fistulous base portion of the ferrule as well as the periphery of the fistulous optical plug supporting member except the backward end portion thereof.

The plug portion of the conversion plug may have its outside diameter which is the same as that of the plug portion of a round shape optical plug that can be inserted into directly the optical signal terminal of a specified size, and the plug-in hole of the conversion plug may be formed such that a round shape optical plug having a plug portion different in the outside diameter thereof from that of the plug portion of the conversion plug can be inserted thereinto.

Alternatively, the plug portion of the conversion plug may have its outside diameter which is the same as that of the plug portion of a round shape optical plug that can be inserted into directly the optical signal terminal of a specified size, and the plug-in hole of the conversion plug may be formed such that a plug portion of a square shape optical plug can be inserted thereinto.

Alternatively, the plug portion of the conversion plug may be formed to have the same shape as that of a plug portion of a square shape optical plug that can be inserted into directly the optical signal terminal of a specified size, and the plug-in hole of the conversion plug may be formed such that a plug portion of a round shape optical plug can be inserted thereinto.

Alternatively, the plug portion of the conversion plug may be formed to have the same shape as that of a plug portion of a first square shape optical plug that can be inserted into directly the optical signal terminal of a specified size, and the plug-in hole of the conversion plug may be formed such that a plug portion of a second square shape optical plug having a different size from that of the first square shape optical plug can be inserted thereinto.

In another aspect of the present invention, there is provided a method of fabricating a conversion plug for an optical signal which comprises the steps of: joining an optical fiber fixing ring and an optical fiber with each other to unify them; finishing the end surface of the optical fiber protruding from the optical fiber fixing ring in mirror surface; inserting the unified optical fiber fixing ring and optical fiber into the inside of a ferrule on which a member made of an insulator is mounted, and tightly fitting the optical fiber fixing ring further into the inside of the ferrule to fix the position of the end surface of the optical fiber already finished in mirror surface at the optimal position; inserting an engagement spring into the inside of the ferrule; and tightly fitting a fistulous optical plug supporting member having a plug-in hole into which an optical plug of a specified size can be inserted, into the inside of the ferrule.

In a preferred embodiment, the aforesaid method further includes, prior to the steps of inserting an engagement spring into the inside of the ferrule and tightly fitting a fistulous optical plug supporting member into the inside of the ferrule, a step of previously getting an amount for the optical fiber fixing ring to be tightly fitted into the inside of the ferrule using a jig.

In addition, the optical fiber fixing ring is tightly fitted into the inside of the ferrule in accordance with the tightly fitted amount previously gotten to fix the position of the end surface of the optical fiber already finished in mirror surface at the optimal position.

The aforesaid method further includes a step of forming a handle portion made of an insulator that covers the periphery of a predetermined portion of the ferrule as well as the periphery of the fistulous optical plug supporting member except the backward end portion thereof.

The aforesaid method may include a step of forming a protective cap for covering the tip portion of the ferrule and a protective cap for closing the plug-in hole of the fistulous optical plug supporting member integrally with the handle portion.

In accordance with the present invention, after the optical fiber fixing ring and the optical fiber have been joined integrally with each other, the end surface of the optical fiber is previously finished in mirror surface. As a result, the mirror surface finishing process is easily performed, one of various types of mirror surface finishing processes may be used, and the finishing state of the end surface of the optical fiber is easily confirmed. Moreover, since the end surface already finished in mirror surface of the optical fiber is protected in the periphery of the end surface by the optical fiber fixing ring, it is possible to insert the optical fiber into the ferrule, to correctly position, and to fix the optical fiber without causing damage on the end surface already finished in mirror surface.

Furthermore, by finely adjusting the position of the optical fiber fixing ring that has been tightly or closely fitted into the ferrule, the position of the end surface of the optical fiber can be fixed at the optimal position. As a result, even if there is any unevenness in the mirror surface finishing process for the end surface of the optical fiber or there is used a different mirror surface finishing method, the position of the end surface of the optical fiber already finished in mirror surface can be always set to the optimal position.

BRIEF DESCRIPTION OF THE DRAWINGS

FIG. 5 illustrates the engagement spring used in the conversion plug for an optical signal shown in FIG. 1, wherein

DETAILED DESCRIPTION OF THE PREFERRED EMBODIMENT

The preferred embodiment of the present invention will now be described in detail with reference to FIGS. 4 to 9. The present invention may, however, be embodied in many different forms and should not be construed as limited to the embodiment set forth hereinafter; rather, the embodiment is provided so that this disclosure will be thorough and complete, and will fully convey the scope of the invention to those skilled in the art.

Figure 1:
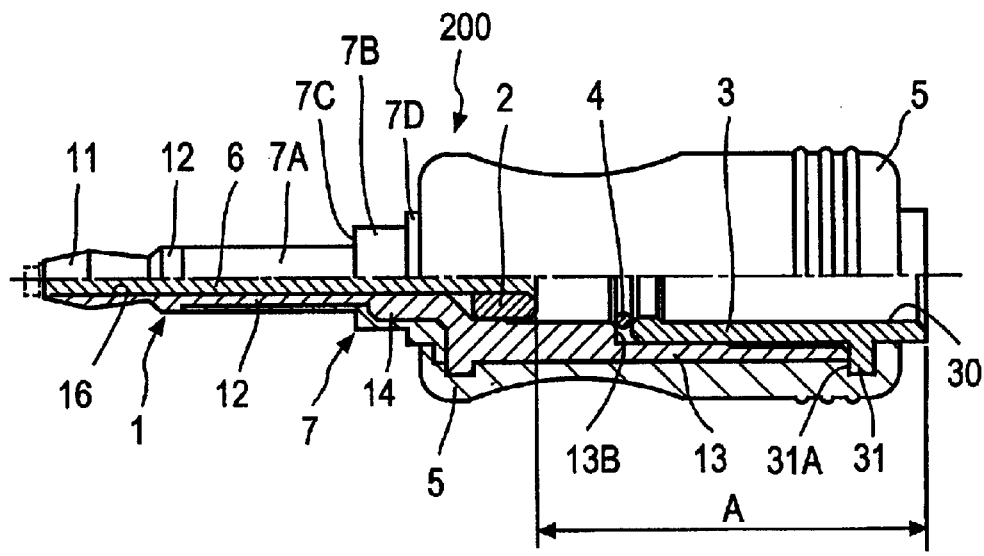
FIG. 1 is a sectional view illustrating an embodiment of the conversion plug for an optical signal according to the present invention, half thereof being illustrated in plan.
Figure 2:
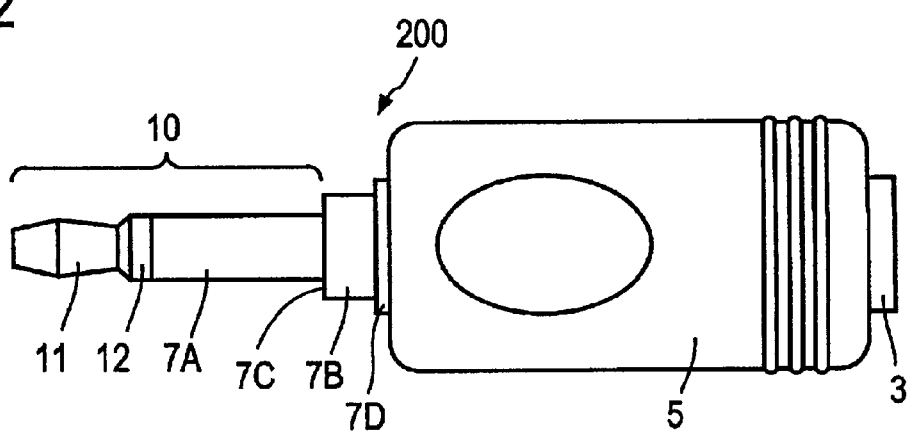
FIG. 2 is a top view of FIG. 1.
Figure 3:
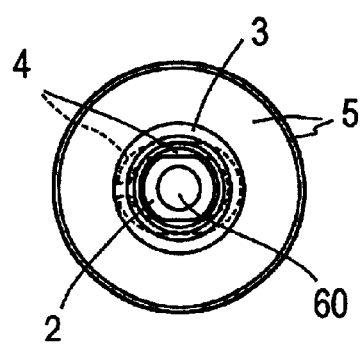
FIG. 3 is a right-hand side view of FIG. 2.

FIG. 1 is a sectional view illustrating an embodiment of the conversion plug for an optical signal according to the present invention, half thereof being illustrated in plan, FIG. 2 is a top view of FIG. 1, and FIG. 3 is a right-hand side view of FIG. 2. Roughly speaking, the conversion plug 200 for an optical signal of this embodiment comprises: a fistulous or hollow ferrule 1 constituted by a cylindrical sleeve portion 12 provided with a fistulous or hollow tip portion 11 at the forward end of the sleeve portion 12, a fistulous or hollow cylindrical base portion 13 the outside diameter of which is considerably greater than that of the sleeve portion 12, and a fistulous or hollow cylindrical middle portion 14 connecting the sleeve portion 12 with the base portion 13 and having its outside diameter greater than that of the sleeve portion 12 and smaller than that of the base portion 13, these portions 11, 12, 13 and 14 being integrally formed with one another; an optical fiber 6 extending from the tip portion 11 through the sleeve portion 12 and the middle portion 14 to the forward end portion of the base portion 13 of the ferrule 1; a cylindrical ring 2 for fixing the optical fiber 6 mounted on the periphery of the backward end portion (the end portion toward the base portion 13 of the ferrule 1) of the optical fiber 6; a cylindrical sleeve 3 to be press-fitted or tightly fitted into the inside of the base portion 13 from the backward end side of the base portion 13 of the ferrule 1; an engagement spring 4 of generally elliptic shape in plan view to be inserted into the inside of the base portion 13 of the ferrule 1 such that it is in contact with the forward end of the sleeve 3; an insulator ring 7 covering the periphery of the sleeve portion 12 except the forward end portion thereof as well as all of the periphery of the middle portion 14 of the ferrule 1; and a handle portion 5 made of an insulator and covering all of the periphery of the base portion 13 of the ferrule 1 as well as the periphery of the sleeve 3 except the backward end portion thereof.

The tip portion 11, the sleeve portion 12 and the middle portion 14 of the ferrule 1 have the same inner diameter and the same axis. Accordingly, a through hole 16 having a constant inner diameter into which the optical fiber 6 can be inserted is formed through the insides of these tip portion 11, sleeve portion 12 and middle portion 14. In addition, in this embodiment, three step portions are formed on the inner surface of the base portion 13 of the ferrule 1, and result in four cylinders having different inner diameters from one another formed in the inside of the base portion 13, the inner diameters being increased toward the backward end of the base portion 13. The inner diameter of the first cylinder at the forward end portion of the base portion 13 is set to a value by which the optical fiber fixing ring 2 mounted on the periphery of the backward end portion of the optical fiber 6 can be press-fitted or tightly fitted into the first cylinder, the inner diameter of the second cylinder subsequent to the first cylinder is set to a value slightly larger than that of the first cylinder by which the optical fiber fixing ring 2 can be loose-fitted or loosely inserted into the second cylinder, the inner diameter of the third cylinder subsequent to the second cylinder is set to a value larger than that of the second cylinder by which the sleeve 3 can be press-fitted into the third cylinder, and the inner diameter of the fourth cylinder at the backward end portion of the base portion 13 is set to a value slightly larger than that of the third cylinder by which the sleeve 3 can be loose-fitted or loosely inserted into the fourth cylinder. Further, the base portion 13 of the ferrule 1 also has the same axis as that of the tip portion 11, the sleeve portion 12 and the middle portion 14.

As shown in FIG. 1, the sleeve portion 7A of the insulator ring 7 that covers the periphery of the sleeve portion 12 of the ferrule 1 except the forward end portion (the end portion toward the tip portion 11) thereof, has its outside diameter identical with that of the forward end portion (the end portion not covered with the insulator ring 7) of the sleeve portion 12. Consequently, the peripheral surface of the forward end portion of the sleeve portion 12 and the peripheral surface of the sleeve portion 7A of the insulator ring 7 form a continuous and flat peripheral surface. In addition, the first cylindrical portion 7B of the insulator ring 7 that covers an area extending from the backward end portion of the sleeve portion 12 to the forward end portion of the middle portion 14 of the ferrule 1, has its outside diameter larger than that of the sleeve portion 7A. The second cylindrical portion 7D of the insulator ring 7 that covers the backward portion of the middle portion 14 of the ferrule 1, has its outside diameter larger than that of the first cylindrical portion 7B and a flange integrally formed with the second cylindrical portion 7D at its backward end.

The first cylindrical portion 7B of the insulator ring 7 has its end surface 7C that abuts against the end surface of an optical signal terminal corresponding to the conversion plug 200 when the plug portion 10 (the tip portion 11 and the sleeve portion 12) of the conversion plug 200 is plugged in this optical signal terminal, and that prevents the tip portion 11 of the conversion plug 200 from further advancing. In other words, the end surface 7C functions as a stopper that prevents the tip portion 11 from coming into collision with the optical plane of the light receiving element of the optical signal terminal.

Since the conversion plug 200 for an optical signal of this embodiment is configured such that a round shape optical plug can be plugged therein, the outside diameter of the sleeve portion 12 of the ferrule 1 and the outside diameter of the sleeve portion 7A of the insulator ring 7 are set to about 2.5 mm so that the conversion plug 200 can be plugged in directly an optical signal terminal for a round shape optical plug having its plug portion of 2.5 mm in outside diameter.

In addition, the sleeve 3 has a plug-in hole 30 therein that a round shape optical plug having its plug portion of 3.5 mm in outside diameter can be plugged in. For this end, the cylindrical sleeve 3 is used in this embodiment. However, in case of forming a plug-in hole 30 in the sleeve 3 that the plug portion of a square shape optical plug can be plugged in, a square shape sleeve that is not of cylindrical shape may be used. That is, a fistulous optical plug supporting member of polygonal shape in section may be used. In case of using an optical plug supporting member of polygonal shape, the internal shape or configuration of the base portion 13 of the ferrule 1 or the whole shape or configuration thereof will be changed to have a shape or configuration corresponding to the optical plug supporting member of polygonal shape.

Showing an example of specified numerical values of the ferrule 1, the whole length of the ferrule 1 is set to about 31.15 mm, the maximum outside diameter of the tip portion 11 is set to about 2.3 mm, the outside diameter of the portion of sleeve portion 12 covered with the insulator ring 7 is set to about 2 mm, the inner diameter of the through hole 16 is set to about 1.1 mm, the inner diameter of the first cylinder of the base portion 13 is set to about 3.2 mm which is approximately the same as the outside diameter of the optical fiber fixing ring 2, the inner diameter of the second cylinder is set to about 3.4 mm larger than that of the first cylinder by 0.2 mm, the inner diameter of the third cylinder is set to about 5.2 mm which is approximately the same as the outside diameter of the sleeve 3, and the inner diameter of the fourth cylinder is set to about 5.4 mm larger than that of the third cylinder by 0.2 mm. Of course, it is needless to say that numerical values of the ferrule 1 are not limited to these numerical values stated above.

Showing an example of specified numerical values of the insulator ring 7, the whole length is set to about 10.2 mm, the outside diameter of the sleeve portion 7A is set to about 2.5 mm, the length in the axial direction of the sleeve portion 7A is set to about 6.7 mm, the outside diameter of the first cylindrical portion 7B is set to about 4 mm, the length in the axial direction of the first cylindrical portion 7B is set to about 2 mm, the outside diameter of the second cylindrical portion 7D is set to about 5.2 mm, and the length in the axial direction of the second cylindrical portion 7D is set to about 1.5 mm. It is to be noted that these numerical values are merely one example, and numerical values of the insulator ring 7 are not limited to these values.

Figure 4:
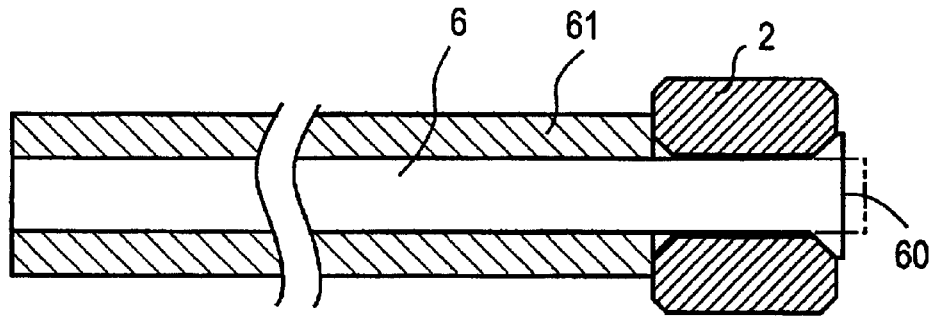
FIG. 4 is a sectional view showing the optical fiber and the cylindrical ring for fixing the optical fiber mounted on the periphery of one end portion of the optical fiber used in the conversion plug for an optical signal shown in FIG. 1.

FIG. 4 is a sectional view showing the optical fiber 6 to be inserted into the through hole 16 having a constant inner diameter that is formed through the insides of the tip portion 11, the sleeve portion 12 and the middle portion 14 of the ferrule 1, and the optical fiber fixing cylindrical ring 2 mounted on the periphery of one end portion of the optical fiber 6. The optical fiber 6 is covered with a sheath 61, and the ring 2 is fixed to the periphery of the backward end portion of the optical fiber 6 after a portion of the sheath 61 covering the periphery of the backward end portion of the optical fiber 6 has been removed. The ring 2 may be joined with or attached to the optical fiber, for example, by use of a suitable adhesive agent, or alternatively, by binding or compressing the ring 2 against the optical fiber 6 to the extent that optical loss of the optical fiber 6 is not increased.

When the optical fiber fixing ring 2 is joined with the periphery of the end portion of the optical fiber 6, the end portion of the optical fiber 6 is held protruding toward the outside by a predetermined length from the backward end surface of the ring 2 as shown in FIG. 4 by a hypothetical line. After the ring 2 and the optical fiber 6 have been joined with each other, the end surface 60 of the optical fiber 6 is finished in mirror surface. As a mirror surface finishing process, there may be used a polishing and mirror surface finishing process that is adopted in case of finishing a spherical lens in spherical mirror surface, a polishing and mirror surface finishing process that is adopted in case of processing a plane of a general article, or the like. In the example shown in FIG. 4, a mirror surface finishing process is used in which the end portion of the optical fiber 6 protruding toward the outside from the backward end surface of the ring 2 is treated with heat to swell that portion, to put the swelled portion tightly or closely on the round-edged internal peripheral surface of the backward end of the ring 2, and to polish and finish the end portion of the optical fiber 6 in a plane mirror surface. Further, when the optical fiber 6 is inserted into the inside of the ferrule 1, the sheath 61 is removed from the optical fiber 6.

In such manner, since the ring 2 and the optical fiber 6 is joined with each other and the end surface 60 of the optical fiber 6 is finished in mirror surface, fabrication of the conversion plug 200 for an optical signal can easily be carried out. For example, it is difficult to carry out positioning of the end surface 60 of the optical fiber 6 that does not have the optical fiber fixing ring 2 joined therewith and has been inserted into the optical fiber inserting through hole 16 of the ferrule 1 while seeing the end surface 60 with the worker's eyes. In addition, the end surface 60 of the optical fiber 6 is required to be finished in mirror surface. However, it is difficult in practice to insert the optical fiber 6 having the end surface 60 already finished in mirror surface into the through hole 16 of the ferrule 1, to properly position the end surface 60, and to fix the optical fiber 6, because this process causes damage on the end surface 60 already finished in mirror surface. Further, after the optical fiber 6 has been inserted into the through hole 16 of the ferrule 1, the end surface 60 has been properly positioned, and the optical fiber 6 has been fixed, finishing of the end surface 60 of the optical fiber 6 in mirror surface is impossible of realization, because the end surface 60 is located in the base portion 13 of the ferrule 1 at a deep position from the backward end of the base portion 13 and it is difficult to finish the end surface 60 located at such deep position in mirror surface.

On the other hand, as in this embodiment, in case the optical fiber fixing ring 2 and the optical fiber 6 is previously joined integrally with each other and the end surface 60 of the optical fiber 6 is previously finished in mirror surface, the mirror surface finishing process is easily performed, and one of various types of mirror surface finishing processes may be used. In addition, the finishing state of the end surface 60 is easily confirmed. Moreover, the position of the end surface 60 of the optical fiber 6 can be fixed to the proper position by adjusting the position (a distance in the direction of depth) of the optical fiber fixing ring 2 that has been tightly or closely fitted into the base portion 13 of the ferrule 1. Furthermore, since the end surface 60 already finished in mirror surface of the optical fiber 6 is protected in the periphery of the end surface 60 by the ring 2, it is possible to insert the optical fiber 6 into the through hole 16 of the ferrule 1, to correctly position, and to fix the optical fiber 6 without causing damage on the end surface 60 already finished in mirror surface. As a result, there are obtained some advantages that the conversion plug 200 for an optical signal is fabricated without difficulty, finishing of the end surface 60 of the optical fiber 6 in mirror surface is easily carried out, the end surface 60 of the optical fiber 6 can be fixed to the proper position, and the like.

In this embodiment, the whole length of the optical fiber 6 is set to about 19.5 mm, the length of the protrusion of the optical fiber 6 protruding toward the outside from the backward end surface of the ring 2 is set to about 0.3 mm, the axial length of the ring 2 is set to about 2.5 mm, the outside diameter of the ring 2 is set to about 3.2 mm, and the inner diameter of the ring 2 is set to about 1.1 mm. It goes without saying that these numerical values are merely one example, and numerical values of the optical fiber 6 and the ring 2 are not limited to these values.

Figure 5A:
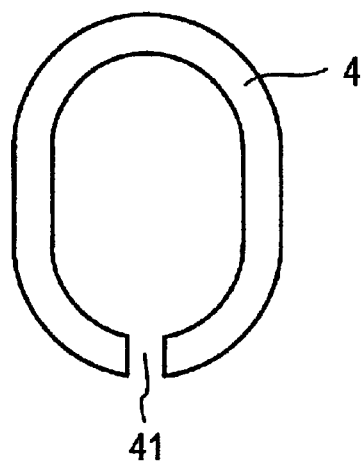
FIG. 5A is a plan view of the engagement spring and FIG. 5B is a right-hand side view of FIG. 5A.
Figure 5B:
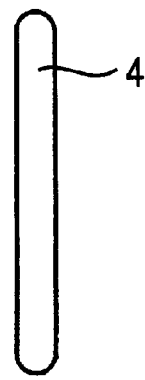

FIG. 5 illustrates the engagement spring 4 to be inserted into the inside of the ferrule 1, wherein FIG. 5A is a plan view of the engagement spring 4 and FIG. 5B is a right-hand side view of FIG. 5A. This engagement spring 4 is of generally circular shape in sectional view and of generally elliptic shape in plan view, and in this embodiment, one of two opposed portions of the engagement spring 4 in the direction of the major axis is cut out by a predetermined length so that a slit 41 is formed. Accordingly, the engagement spring 4 has elasticity that is elastic generally in the direction of the minor axis with the other of two opposed portions of the engagement spring 4 in the direction of the major axis as the center of the elastic motion. The engagement spring 4 is inserted into the inside of the base portion 13 of the ferrule 1 and is arranged such that it abuts against the second step 13B (see FIG. 1) formed on the internal surface of the base portion 13. The engagement spring 4 may be formed by treating or working a good workable and inexpensive ring-like spring. Alternatively, there may be used a plate-like or sheet-like spring such as a contact piece used in a jack of an electrical connector, that contacts with a tip portion of an electrical plug and holds it.

In this embodiment, since the engagement spring 4 is used for engaging and holding a tip portion of an round shape optical plug having its plug portion of 3.5 mm in outside diameter, the length of the engagement spring 4 in the direction of the major axis is set to about 5 mm, the length of the engagement spring 4 in the direction of the minor axis is set to about 3.8 mm, the inner length (the length not inclusive of diameters of opposed sides of the spring 4) of the engagement spring 4 in the direction of the minor axis is set to about 2.6 mm, and the width of the slit 41 is set to about 0.5 mm. It is to be noted that these numerical values are merely one example, and numerical values of the spring 4 are not limited to these values. As will be described later on, a tip portion of an round shape optical plug having its plug portion of 3.5 mm in outside diameter enters into the engagement spring 4, and the backward portion of the tip portion subsequent to the maximum diameter portion of the tip portion is nipped and engaged.

Figure 6:
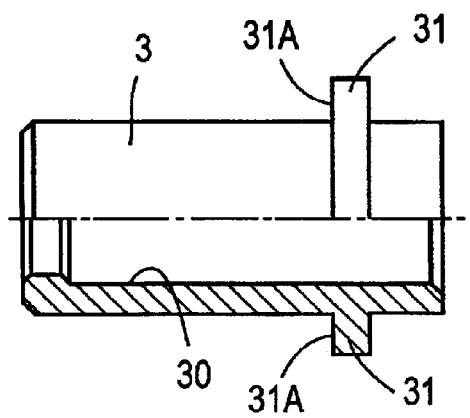
FIG. 6 is a sectional view illustrating the sleeve used in the conversion plug for an optical signal shown in FIG. 1, half thereof being illustrated in plan.

FIG. 6 is a plan view illustrating the cylindrical sleeve 3 press-fitted or tightly fitted into the inside of the base portion 13 from the backward end of the base portion 13 of the ferrule 1, half thereof being illustrated in sectional view. It is to be noted that the forward end (the left-hand end as viewed in the drawing) of the sleeve 3 is thick in thickness thereof and the inside diameter of the forward end is larger than that of the remaining portion of the sleeve 3, and that when the sleeve 3 is press-fitted into the base portion 13 of the ferrule 1, the forward end of the sleeve 3 abuts against the engagement spring 4 described above so that the spring 4 is put between the second step 13B on the internal surface of the base portion 13 and the forward end of the sleeve 3. The inside diameter of the sleeve 3 is constant except the forward end thereof, and the plug-in hole 30 is formed in the sleeve 3, into which a plug portion of an optical plug can be inserted. A flange 31 is formed integrally with the sleeve 3 on the periphery thereof near the backward end (the right-hand end as viewed in the drawing) of the sleeve 3. This flange 31 serves to define the length of the sleeve 3 to be tightly fitted or press-fitted into the base portion 13 of the ferrule 1 when the sleeve 3 is tightly fitted or press-fitted into the base portion 13 by the front end surface 31A of the flange 31 abutting against the backward end surface of the base portion 13.

Showing an example of specified numerical values of the sleeve 3, the whole length thereof is set to about 11.45 mm, the outside diameter thereof is set to about 5.2 mm, the inside diameter thereof is set to about 3.56 mm, the outside diameter of the flange 31 is set to about 7.6 mm, the thickness (the length in the axial direction) of the flange 31 is set to about 1 mm, the length extending form the front end surface 31A to the backward end surface of the sleeve 3 is set to about 3 mm, the inside diameter of the thick portion (the forward end) of the sleeve 3 is set to about 3.2 mm, and the length in the axial direction of the thick portion is set to about 1.25 mm. It is to be noted that these numerical values are merely one example, and numerical values of the sleeve 3 are not limited to these values.

Figure 12:
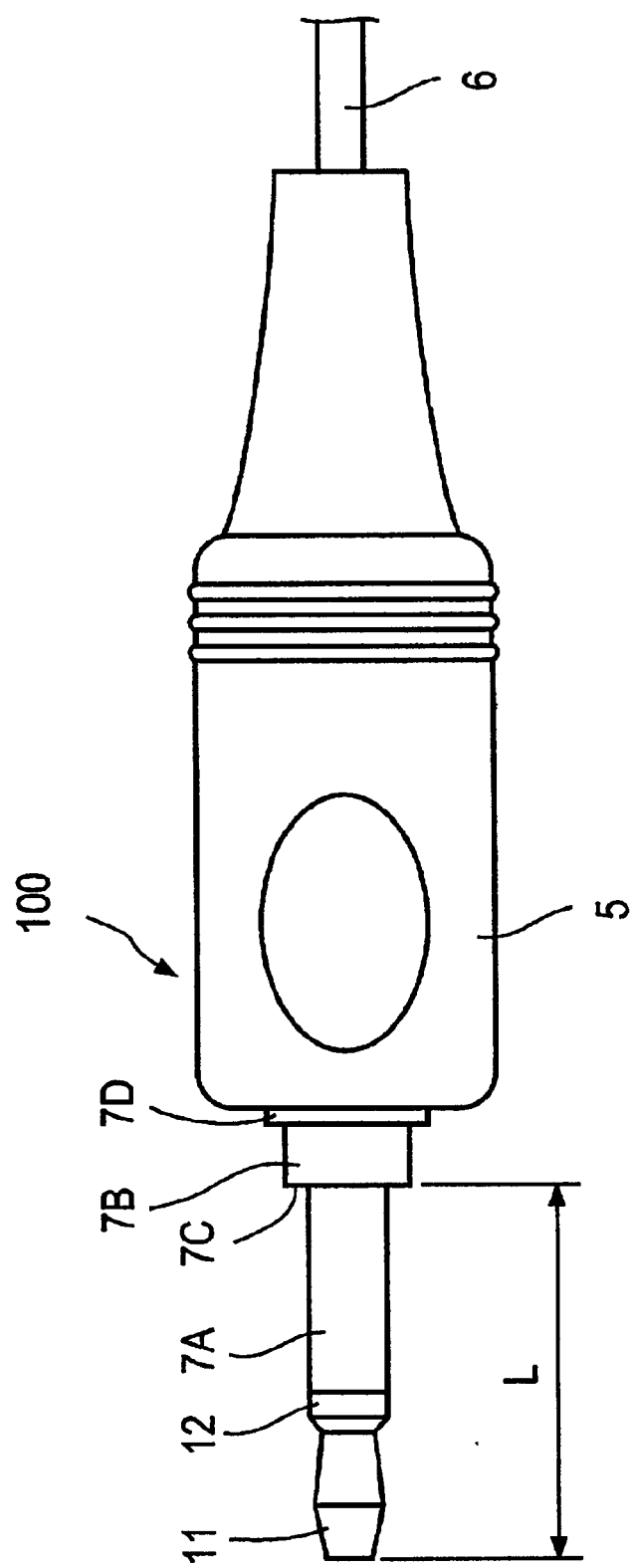
FIG. 12 is a plan view illustrating an example of the optical plug having its plug portion of 3.5 mm in outside diameter.

As discussed above, the conversion plug 200 for an optical signal of this embodiment has the plug-in hole 30 in the sleeve 3, into which a round shape optical plug having its plug portion of 3.5 mm in the outside diameter can be inserted. As shown in FIG. 12, a round shape optical plug 100 having its plug portion of 3.5 mm in the outside diameter (concretely, the outside diameter of the sleeve portion 12 of the ferrule not covered with the insulator ring 7 and the sleeve portion 7A of the insulator ring 7 is 3.5 mm) is configured such that the length L of the plug portion thereof (the length extending from forward end surface (optical base plane) of the tip portion 11 to the end surface (mechanical base plane) 7C of the first cylindrical portion 7B of the insulator ring 7) has a value of (15−0.3) mm to (15+0) mm prescribed by EIAJ (Electronic Industries Association of Japan) Standards. Accordingly, in order not to cause damage on the end surface 60 finished in mirror surface of the optical fiber 6, in the conversion plug 200 for an optical signal of this embodiment, it is necessary to set the length A (see FIG. 1) extending from the end surface 60 (optical base plane) of the optical fiber 6 to the backward end surface (mechanical base plane) of the sleeve 3 already press-fitted into the base portion 13 of the ferrule 1 to a value equal to or larger than 15 mm that is the maximum value of the length L of the plug portion of a round shape optical plug 100 of 3.5 mm in the outside diameter. However, optical loss is increased as a gap between the end surface 60 of the optical fiber 6 and the forward end surface of the tip portion 11 of the round shape optical plug 100 of 3.5 mm in the outside diameter becomes large. Therefore, it is preferred to set the length A of the conversion plug 200 to a value of (15−0) mm to (15+0.05) mm or so.

In this embodiment, as described above, the position of the end surface 60 of the optical fiber 6 is optimized by finely adjusting the position of the optical fiber fixing ring 2 press-fitted into the base portion 13 of the ferrule 1 such that the position of the end surface 60 is set to the proper position whereby the length A of the conversion plug 200 falls within the range of (15−0) mm to (15+0.05) mm.

Now, a method of fabricating the conversion plug 200 for an optical signal constructed as described above will be described.

First, the insulator ring 7 is mounted on the ferrule 1. The insulator ring 7 may be integrally formed on the periphery of a predetermined portion of the ferrule 1 by, for example, insert molding. Of course, it is possible to prepare the insulator ring 7 as a part for assembly and to mount it on the ferrule 1.

Next, as explained above, the optical fiber fixing ring 2 and the optical fiber 6 are joined with each other to unify them, and after the end surface 60 of the optical fiber 6 has been finished in mirror surface, the sheath 61 of the optical fiber 6 is removed and the optical fiber 6 is inserted into the inside of the ferrule 1 from the side of the base portion 13 thereof. On this occasion, the optical fiber 6 is inserted into the through hole 16 of the ferrule 1 by tightly fitting the optical fiber fixing ring 2 into the first cylinder of the base portion 13 of the ferrule 1.

By tightly fitting the optical fiber fixing ring 2 into the first cylinder of the ferrule base portion 13 up to a predetermined position therein, the optical fiber 6 is fixed at a predetermined position in the ferrule 1. Further, it may occur no problem that the step of mounting the insulator ring 7 on the ferrule 1 is carried out earlier than the step of joining the optical fiber fixing ring 2 and the optical fiber 6 with each other to unify them, or the step of joining the optical fiber fixing ring 2 and the optical fiber 6 with each other to unify them is carried out earlier than the step of mounting the insulator ring 7 on the ferrule 1.

Next, the engagement spring 4 is inserted into the base portion 13 of the ferrule 1 to abut the spring 4 against the second step 13B. Thereafter, the cylindrical sleeve 3 is inserted into the ferrule base portion 13 and is tightly fitted or press-fitted into the inside of the third cylinder until the front end surface 31A of the flange 31 abuts against the backward end surface of the ferrule base portion 13. By this step, the engagement spring 4 is sandwiched between the second step 13B and the forward end of the sleeve 3 as well as the length A extending from the end surface 60 of the optical fiber 6 of the conversion plug 200 to the backward end surface of the sleeve 3 already tightly fitted into the ferrule base portion 13 is set.

Here, there may occur a case that in case of finishing the end surface 60 of the optical fiber 6 in mirror surface, the length in the axial direction between the end surface 60 of the optical fiber 6 and the backward end surface of the ring 2 is not identical with, namely, is different from that of another conversion plug for an optical signal due to unevenness of the mirror surface finishing process or use of a different mirror surface finishing method. In other words, there may be cases that the length in the axial direction of the optical fiber 6 protruding from the backward end surface of the ring 2 differs from that of another conversion plug for an optical signal.

Figure 7:
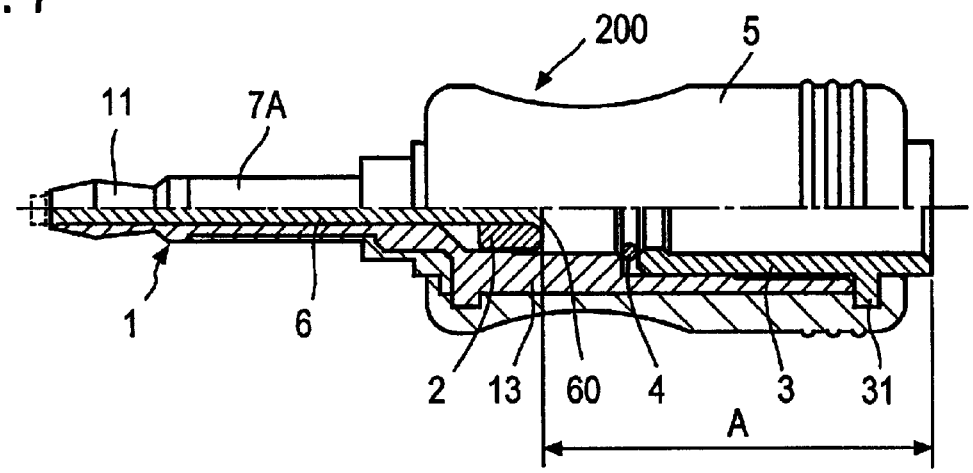
FIG. 7 is a sectional view illustrating the position of the end surface of the optical fiber in a case that the end surface finished in mirror surface is at the normal position in the conversion plug for an optical signal shown in FIG. 1, half thereof being illustrated in plan.
Figure 8:
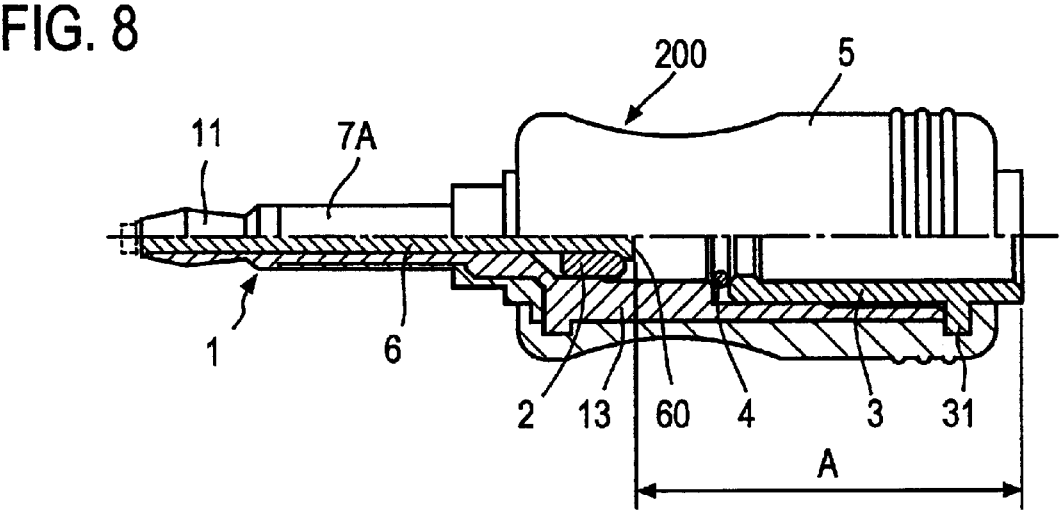
FIG. 8 is a sectional view illustrating the position of the end surface of the optical fiber in a case that the end surface finished in mirror surface is at a position shifted from the normal end surface position in the conversion plug for an optical signal shown in FIG. 1, half thereof being illustrated in plan.
Figure 9:
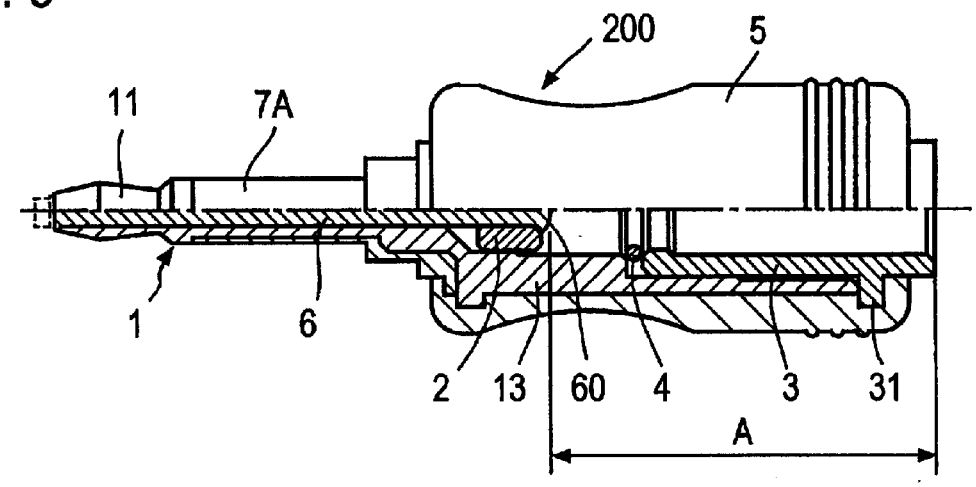
FIG. 9 is a sectional view illustrating the position of the end surface of the optical fiber in a case that the end surface is finished in a convex mirror surface in the conversion plug for an optical signal shown in FIG. 1, half thereof being illustrated in plan.

FIG. 7 illustrates the standard case in which the end surface 60 of the optical fiber 6 is finished in planar mirror surface. In this standard case, the end surface 60 of the optical fiber 6 is substantially flush with the backward end surface of the ring 2 or protrudes from the backward end surface of the ring 2 by a very slight length as shown in FIG. 4. FIG. 8 illustrates another case in which the end surface 60 of the optical fiber 6 is finished in planar mirror surface as in the case of FIG. 7, but the end surface 60 of the optical fiber 6 protrudes from the backward end surface of the ring 2 larger than the length of the standard case of FIG. 7. FIG. 9 illustrates still another case in which the end surface 60 of the optical fiber 6 is finished in spherical mirror surface and as a result, the end surface 60 of the optical fiber 6 protrudes from the backward end surface of the ring 2 larger than the length of the standard case of FIG. 7.

In order to optimize the length A extending from the end surface 60 of the optical fiber 6 to the backward end surface of the sleeve 3 already tightly fitted into the ferrule base portion 13, in practice, prior to the steps of inserting the engagement spring 4 into the ferrule 1 and tightly fitting the sleeve 3 into the ferrule 1 to fix the sleeve 3 in the ferrule 1, an amount for the optical fiber fixing ring 2 to be tightly fitted into the first cylinder of the base portion 13 (the distance of the ring 2 to be tightly fitted into the first cylinder in the direction of the depth) is previously found or gotten by use of a proper jig not shown. The ring 2 is tightly fitted into the inside of the first cylinder in accordance with the tightly fitted amount previously gotten. This step results in the end surface 60 of the optical fiber 6 that is fixed at the predetermined position in the first cylinder. That is, the length A extending from the end surface 60 of the optical fiber 6 to the backward end surface of the sleeve 3 falls within the range of (15−0) mm to (15+0.05) mm.

For example, in the cases shown in FIGS. 8 and 9, since the end surface 60 of the optical fiber 6 protrudes from the backward end surface of the ring 2 larger than the length of the standard case of FIG. 7, if the tightly fitted amount for the ring 2 to be tightly fitted into the first cylinder should be identical with that of the standard case shown in FIG. 7, the position of the end surface 60 of the optical fiber 6 would approach the side of the sleeve 3 as compared with the standard case shown in FIG. 7. In other words, the length A extending from the end surface 60 of the optical fiber 6 to the backward end surface of the sleeve 3 becomes shorter than that of the standard case shown in FIG. 7. In such case, when the optical plug having its plug portion of 3.5 mm in the outside diameter is inserted into the sleeve 3, the forward end of the optical plug of 3.5 mm collides against the end surface 60 of the optical fiber 6, and hence there is possibility that the end surface 60 of the optical fiber 6 and/or the optical plane of the forward end of the tip portion of the optical plug of 3.5 mm sustain damage. For this reason, as shown in FIGS. 8 and 9, the press-fitted amount of the ring 2 into the first cylinder is increased or finely adjusted in accordance with the previously found tightly fitted amount for the ring 2 such that the position of the end surface 60 of the optical fiber 6 takes the same position as that of the standard case shown in FIG. 7. By adopting such step, in the cases shown in FIGS. 8 and 9 too, the length A extending from the end surface 60 of the optical fiber 6 to the backward end surface of the sleeve 3 becomes identical with that of the standard case shown in FIG. 7.

Further, even there is some difference in the amount or length of the optical fiber 6 projecting from the forward end of the tip portion 11 of the ferrule 1 between the cases shown in FIGS. 7, 8 and 9, the projecting portion of the optical fiber 6 is removed when that portion of the optical fiber 6 is surface-finished later on, and accordingly, it offers no problem at all. In the standard case shown in FIG. 7 too, the length of the optical fiber 6 is set to a value that the forward end portion of the optical fiber 6 projects from the forward end of the tip portion 11 of the ferrule 1 since there is a necessity to surface-finish the forward end portion of the optical fiber 6.

In such manner, after the optical fiber fixing ring 2 has been tightly fitted into the inside of the first cylinder of the ferrule base portion 13 in accordance with the previously gotten tightly fitted amount for the ring 2, the engagement spring 4 is inserted into the base portion 13 of the ferrule 1 to abut the spring 4 against the second step 13B, and subsequently, the sleeve 3 is inserted into the ferrule base portion 13 and then is tightly fitted or press-fitted into the inside of the third cylinder until the front end surface 31A of the flange 31 abuts against the backward end surface of the ferrule base portion 13. By these steps, the length A extending from the end surface 60 of the optical fiber 6 to the backward end surface of the sleeve 3 is optimized.

Next, the handle portion 5 of generally cylindrical shape made of an insulator and covering a peripheral area extending from the backward portion of the second cylindrical portion 7D of the insulator ring 7 to the portion of the sleeve 3 near the backward end portion thereof is integrally formed. In this case, since the portions of the ferrule 1 and the sleeve 3 on which the handle portion 5 is to be formed have no hole or opening or the like, the handle portion 5 may be formed by insert molding. As a result, the cost of the handle portion 5 can be reduced.

Figure 10:
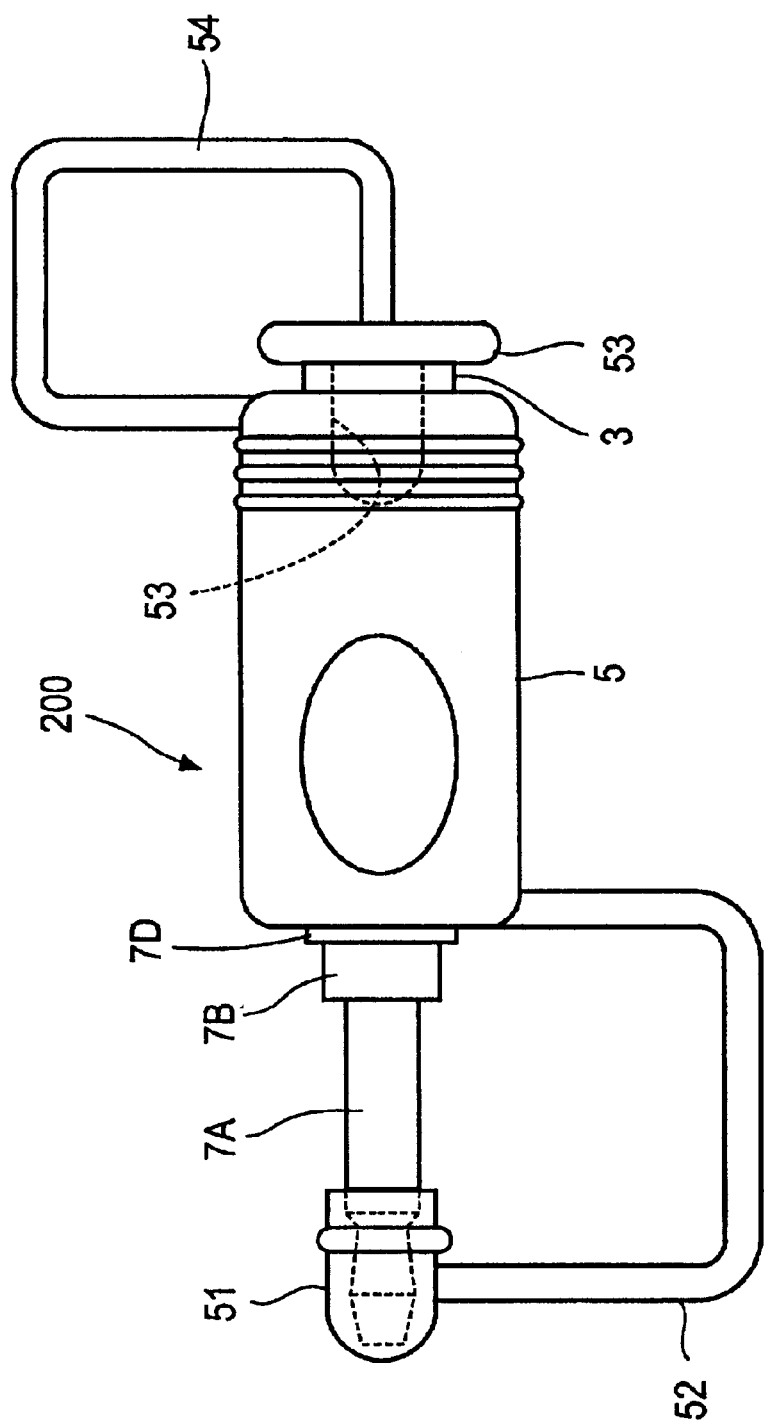
FIG. 10 is a plan view illustrating an example of the conversion plug for an optical signal shown in FIGS. 1 and 2 in which respective caps for protecting the tip portion and the plug-in hole of the conversion plug are formed integrally with the handle portion thereof.

In case of forming the handle portion 5 by insert molding using soft vinyl chloride, soft elastomer or the like, as shown in FIG. 10, a protective cap 51 for covering the tip portion 11 of the ferrule 1 and a protective cap 53 for closing the plug-in hole 30 of the sleeve 3 into which an optical plug having its sleeve of 3.5 mm in the outside diameter is inserted can be formed integrally with the handle portion 5. In such case, the protective caps 51 and 53 are connected to the handle portion 5 by straps 52 and 54 formed integrally with the handle portion 5, respectively.

In this manner, if the protective caps 51 and 53 are formed integrally with the handle portion 5, any stain, damage or the like on the optical fiber 6 can be prevented, and also any stain in the plug-in hole 30 of the sleeve 3, the entrance of dirt, dust or the like into the plug-in hole 30 of the sleeve 3, or the like can be prevented. In addition, it is possible to prevent the protective caps 51 and 53 from being lost.

Further, it is needless to say that the handle portion 5 may be prepared as a part for assembly and may be mounted to cover a peripheral area extending from the backward portion of the second cylindrical portion 7D of the insulator ring 7 to the portion of the sleeve 3 near the backward end portion thereof. In addition, it is to be noted that the external appearance and shape or configuration of the handle portion 5 is not limited to the cylindrical shape. For example, the handle portion 5 may have its external appearance and shape of square pillar shape.

Figure 11:
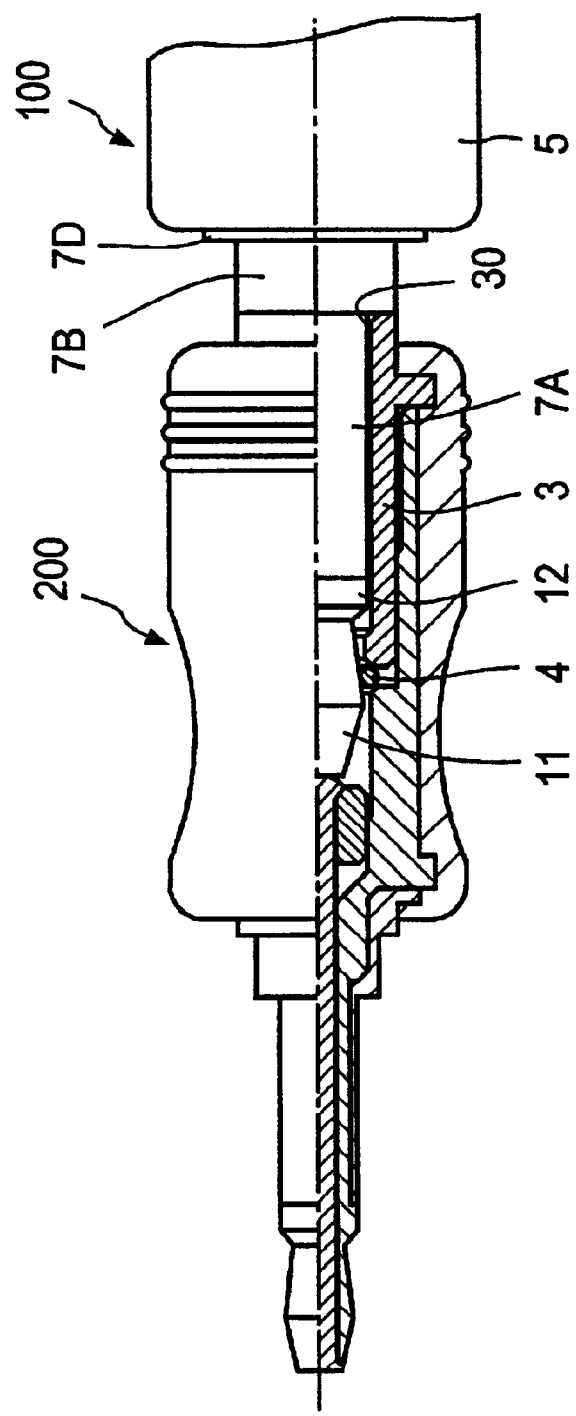
FIG. 11 is a sectional view illustrating an example of the conversion plug for an optical signal shown in FIGS. 1 and 2 in which an optical plug having its plug portion of 3.5 mm in outside diameter has been inserted into the plug-in hole of the conversion plug, half thereof being illustrated in plan.

FIG. 11 illustrates the manner in which a round shape optical plug 100 having its plug portion (sleeve) of 3.5 mm in outside diameter shown in FIG. 12 has been inserted into the plug-in hole 30 of the sleeve 3 of the conversion plug 200 for an optical signal constructed as described above. In FIG. 11, the conversion plug 200 is shown with half thereof in sectional view. When the round shape optical plug 100 of 3.5 mm in outside diameter is inserted into the plug-in hole 30 of the sleeve 3 of the conversion plug 200, the tip portion 11 of the round shape optical plug 100 of 3.5 mm enters into the engagement spring 4 of the conversion plug 200. Since the inside diameter of the engagement spring 4 in the direction of the minor axis thereof is set to about 2.6 mm, the engagement spring 4 opens outward. Immediately after the maximum diameter portion of the tip portion 11 has passed through the engagement spring 4, the end surface 7C of the first cylindrical portion 7B of the round shape optical plug 100 of 3.5 mm abuts against the backward end surface of the sleeve 3 of the conversion plug 200. Accordingly, a portion of the tip portion 11 of the round shape optical plug 100 immediately after the maximum diameter portion of the tip portion 11 is nipped by the engagement spring 4 and held in position by a spring force thereof. As a result, the end surface 60 of the optical fiber 6 of the conversion plug 200 is exactly opposed to the forward end surface (optical plane) of the tip portion 11 of the round shape optical plug 100 with substantially no gap therebetween, and the end surface 60 of the optical fiber 6 and the forward end surface of the tip portion 11 are optically coupled with each other with almost no optical loss. Therefore, if the plug portion 10 of the conversion plug 200 for an optical signal is inserted into an optical signal terminal corresponding thereto, the round shape optical plug 100 of 3.5 mm in the outside diameter can be optically connected to the optical signal terminal for the round shape optical plug 200 of 2.5 mm in the outside diameter.

As described above, according to the embodiment, the plug portion 10 of the conversion plug 200 for an optical signal can be inserted into directly an optical signal terminal having structure corresponding thereto, and hence in the conversion plug 200, only one optical coupling is effected. Moreover, since the length A extending from the end surface 60 of the optical fiber 6 to the backward end surface of the sleeve 3 can be optimized, optical loss is a very little and optical transmission characteristic is hardly deteriorated. In addition, only one of two optical plugs mounted to one optical cable is inserted into the conversion plug 200, and hence the whole length of the optical fiber is substantially not lengthened. That is, it is substantially the same as a case that an optical connection to the optical signal terminal is effected using one optical fiber. Accordingly, optical transmission characteristic is not affected.

Furthermore, after the optical fiber fixing ring 2 and the optical fiber 6 have been joined integrally with each other, the end surface 60 of the optical fiber 6 is previously finished in mirror surface. As a result, the optical fiber 6 can be inserted into the through hole 16 of the ferrule 1, and positioned at and fixed to the proper position in the ferrule 1 without causing damage on the end surface 60 already finished in mirror surface. Thus, assembly of the conversion plug 200 can easily be carried out.

In the aforesaid embodiment, at one end portion of the conversion plug 200 is formed the plug portion 10 that can be inserted into directly an optical signal terminal for the round shape optical plug having its plug portion of 2.5 mm in the outside diameter and at the other end portion of the conversion plug 200 is formed the plug-in hole 30 into which the round shape optical plug having its plug portion of 3.5 mm in the outside diameter can be inserted. However, it should be noted that the present invention is not limited to the structure, shape, configuration, etc. of the embodiment. For example, the present invention may be also applied to a case that at one end portion of the conversion plug 200 is formed the plug portion 10 that can be inserted into directly an optical signal terminal for the round shape optical plug having its plug portion of 3.5 mm in the outside diameter and at the other end portion of the conversion plug 200 is formed the plug-in hole 30 into which the round shape optical plug having its plug portion of 2.5 mm in the outside diameter can be inserted, and the same function and effects can be obtained. The outside diameter of the plug portion is not limited to 2.5 mm and 3.5 mm, and the present invention may be applied to a case that the outside diameter of the plug portion that can be inserted into directly an optical signal terminal for a round shape optical plug differs from the outside diameter of the plug portion of a round shape optical plug inserted into the plug-in hole, and the same function and effects can be obtained.

In addition, it is needless to say that the present invention may be also applied to a case that at one end portion of the conversion plug 200 is formed the plug portion that can be inserted into directly an optical signal terminal for a round shape optical plug of a specified dimension or size and at the other end portion of the conversion plug 200 is formed the plug-in hole into which a square shape optical plug of a specified dimension or size can be inserted, or a case that at one end portion of the conversion plug 200 is formed the plug portion that can be inserted into directly an optical signal terminal for a square shape optical plug of a specified dimension or size and at the other end portion of the conversion plug 200 is formed the plug-in hole into which a round shape optical plug of a specified dimension or size can be inserted, and the same function and effects can be obtained.

Moreover, it is to be noted that in a case that at one end portion of the conversion plug 200 is formed the plug portion that can be inserted into directly an optical signal terminal for a square shape optical plug of a specified dimension or size and at the other end portion of the conversion plug 200 is formed the plug-in hole into which the plug portion of a square shape optical plug is inserted, the present invention may be also applied to the case if dimension or size of the plug portion formed at the one end portion differs from dimension or size of the square shape optical plug inserted into the plug-in hole, and the same function and effects can be obtained.

As is apparent from the foregoing description, according to the present invention, after the optical fiber fixing ring and the optical fiber have been joined integrally with each other, the end surface of the optical fiber is finished in mirror surface. As a result, there are obtained some advantages that the mirror surface finishing process is easily performed, one of various types of mirror surface finishing processes may be used, and the finishing state of the end surface of the optical fiber is easily confirmed. Moreover, since the end surface already finished in mirror surface of the optical fiber is protected in the periphery of the end surface by the optical fiber fixing ring, further advantage is obtained that it is possible to insert the optical fiber into the ferrule, to properly position, and to fix the optical fiber without causing damage on the end surface already finished in mirror surface.

Furthermore, by finely adjusting the position (a distance in the direction of depth) of the optical fiber fixing ring that is tightly or closely fitted into the ferrule, the position of the end surface of the optical fiber can be fixed at the optimal position. As a result, there is obtained still further advantage that even if there is any unevenness in the mirror surface finishing process for the end surface of the optical fiber or there is used a different mirror surface finishing method, the position of the end surface of the optical fiber already finished in mirror surface can be always set to the optimal position.

Thus, there are provided a conversion plug for an optical signal that is low in optical loss, is easy in fabrication, and is inexpensive, and a method of fabricating such conversion plug for an optical signal.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. A conversion plug for an optical signal comprising:
   a plug portion to be inserted directly into an optical signal terminal of a specified size;
   an optical fiber within the plug portion, wherein said optical fiber has a first end and a second end;
   an optical fiber fixing ring on the periphery of a portion of the optical fiber nearer the first end, the surface of said first end of the optical fiber protruding from the optical fiber fixing ring and having a mirror surface, and wherein the optical fiber fixing ring fixes the position of the surface of the first end of the optical fiber; and a plug-in hole into which an optical plug having a plug portion that cannot be inserted into directly said optical signal terminal of a specified size can be inserted.

2. The conversion plug as set forth in claim 1, comprising:

a ferrule constituted by a cylindrical sleeve portion with an internal fistulous base portion having its outside dimension larger than that of the sleeve portion, and the cylindrical sleeve portion having a fistulous tip portion at the forward end thereof; and a fistulous optical plug supporting member inside of the fistulous base portion of the ferrule, and wherein said plug portion of the conversion plug is constituted by the tip portion and the sleeve portion of the ferrule;

said optical fiber is inserted into a through hole formed in the sleeve portion and the tip portion from the inside of the fistulous base portion of the ferrule as the optical fiber fixing ring is tightly fitted into the inside of the fistulous base portion of the ferrule; and said plug-in hole of the conversion plug is formed in said fistulous optical plug supporting member.

3. The conversion plug as set forth in claim 2, further including: an engagement spring inside of the fistulous base portion of the ferrule and in contact with the forward end of the fistulous optical plug supporting member, elastically engaging and holding a tip portion of the plug portion of an optical plug to be inserted into the plug-in hole of the fistulous optical plug supporting member.

4. The conversion plug as set forth in claim 2, further including:

a member made of an insulator that covers an peripheral area extending from the vicinity of the forward end portion of the sleeve portion of the ferrule to the vicinity of the forward end of the fistulous base portion of the ferrule; and a handle portion made of an insulator that covers the periphery of the fistulous base portion of the ferrule as well as the periphery of the fistulous optical plug supporting member except the backward end portion thereof.

5. The conversion plug as set forth in claim 3, further including:

a member made of an insulator that covers an peripheral area extending from the vicinity of the forward end portion of the sleeve portion of the ferrule to the vicinity of the forward end of the fistulous base portion of the ferrule; and a handle portion made of an insulator that covers the periphery of the fistulous base portion of the ferrule as well am the periphery of the fistulous optical plug supporting member except the backward end portion thereof.

6. The conversion plug as set forth in claim 1, wherein the plug portion of said conversion plug has its outside diameter which is the same as that of the plug portion of a round shape optical plug that can be inserted into directly said optical signal terminal of a specified size, and the plug-in hole of said conversion plug is formed such that a round shape optical plug having a plug portion different in the outside diameter thereof from that of the plug portion of the conversion plug can be inserted thereinto.

7. The conversion plug as set forth in claim 1, wherein the plug portion of said conversion plug has its outside diameter which is the same as that of the plug portion of a round shape optical plug that can be inserted into directly said optical signal terminal of a specified size, and the plug-in hole of said conversion plug is formed such that a plug portion of a square shape optical plug can be inserted thereinto.

8. The conversion plug as set forth in claim 1, wherein the plug portion of said conversion plug has the same shape as that of a plug portion of a square shape optical plug that can be inserted into directly said optical signal terminal of a specified size, and the plug-in hole of said conversion plug is such that a plug portion of a round shape optical plug can be inserted thereinto.

9. The conversion plug as set forth in claim 1, wherein the plug portion of said conversion plug has the same shape as that of a plug portion of a first square shape optical plug that can be inserted into directly said optical signal terminal of a specified size, and the plug-in hole of said conversion plug is such that a plug portion of a second square shape optical plug having a different size from that of the first square shape optical plug can be inserted thereinto.

10. A method of fabricating a conversion plug for an optical signal comprising the steps of:

joining an optical fiber fixing ring and an optical fiber with each other wherein the optical fiber has a first end and a second end, and the optical fiber fixing ring is joined to the optical fiber nearer the first end;

finishing the surface of the first end of the optical fiber protruding from the optical fiber fixing ring in mirror surface;

inserting the unified optical fiber fixing ring and optical fiber into the inside of a ferrule on which a member made of an insulator is mounted, and tightly fitting the optical fiber fixing ring further into the inside of the ferrule to fix the position of the end-surface of the first end of the optical fiber at the optimal position;

inserting an engagement spring into the inside of the ferrule; and tightly fitting a fistulous optical plug supporting member having a plug-in hole into which an optical plug of a specified size can be inserted, into the inside of the ferrule.

11. The method as set forth in claim 10, further including, prior to the steps of inserting an engagement spring into the inside of the ferrule and tightly fitting a fistulous optical plug supporting member into the inside of the ferrule, a step of previously getting an amount for the optical fiber fixing ring to be tightly fitted into the inside of the ferrule using a jig.

12. The method as set forth in claim 11, wherein the optical fiber fixing ring is tightly fitted into the inside of the ferrule in accordance with the tightly fitted amount previously gotten to fix the position of the end surface of the optical fiber already finished in mirror surface at the optimal position.

13. The method as set forth in claim 10, further including a step of forming a handle portion made of an insulator that covers the periphery of a predetermined portion of the ferrule as well as the periphery of the fistulous optical plug supporting member except the backward end portion thereof.

14. The method as set forth in claim 13, further including a step of forming a protective cap for covering the tip portion of the ferrule and a protective cap for closing the plug-in hole of the fistulous optical plug supporting member integrally with said handle portion.

* * * * *